Jan. 19, 1971 S. L. VAN KIRK 3,555,702
CLASSROOM SEATING CHART WITH MOVABLE ELEMENTS
Filed May 13, 1968
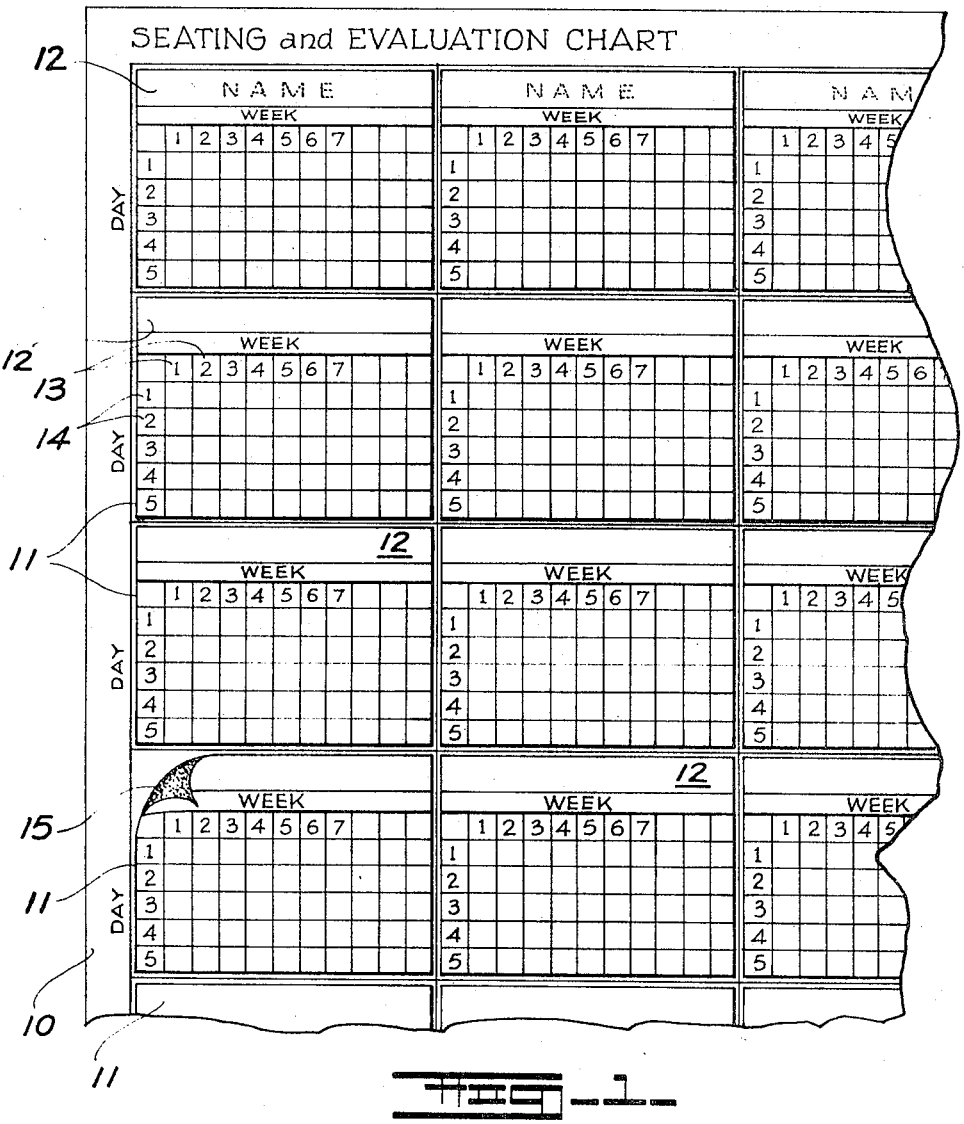
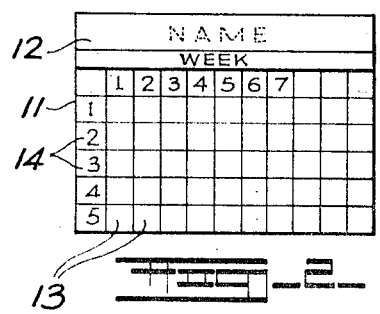
INVENTOR.
SARA LOUISE Van KIRK
BY
ATTORNEY.

United States Patent Office 3,555,702
Patented Jan. 19, 1971

3,555,702
CLASSROOM SEATING CHART WITH MOVABLE ELEMENTS
Sara Louise Van Kirk, Youngstown, Ohio
(P.O. Box 15454, Phoenix, Ariz. 85018)
Filed May 13, 1968, Ser. No. 728,693
Int. Cl. G09b 1/00
U.S. Cl. 35—7                                7 Claims

ABSTRACT OF THE DISCLOSURE

A classroom seating chart consisting of a base sheet and a plurality of individual chart like units removably affixed thereto and capable of receiving desirable indicia. Each of the chart like units has a self-adhering material removably affixing it to the base sheet so that each unit may be removed to an alternate location or removed from the base sheet as the student seating and location varies in the classroom in which the seating chart is used.

BACKGROUND OF THE INVENTION (1) Field of the invention

This invention relates to charts and record books as used in classrooms for recording student attendance grades and the like.

(2) Description of the prior art

Prior devices comprise generally printed paper sheets on which the teacher writes the names of the students in the arrangement of the seating in the classroom concerned. Some such charts provide room for attendance and grading marking and some merely provide for the seating arrangement indication. Some prior art devices include removable individual units positioned in pockets n a multi-part base sheet or assembly (see U.S. Pat. 1,788,715).

This invention eliminates the complexity of such multi-part devices and provides a simpler, less expensive quicker means of varying a classroom seating chart when the student's seats are moved or vacated.

SUMMARY OF THE INVENTION

The classroom seating chart disclosed herein comprises a base sheet and a surface sheet removably adhered thereto by a suitable self-adhering adhesive. The surface sheet is precut into a plurality of individual units which may be individually removed from the base sheet at will and shifted to an alternate position or removed completely as the actual seating in the classroom represented by the seating chart varies. It is frequently necessary to change student's seats and the current charts are difficult to adjust to such situations. In the present invention, the moving of a student from one seat location to another is readily indicated on the seating chart by simply removing the individual seat location unit from its original location and relocating it in the new location corresponding with the student's new location in the classroom. Each of the individual units of the seating chart provide a number of vertical columns corresponding with the weeks of the grade period and a number of horizontal columns crossing the same corresponding with the individual days of the week. Each of the individual units includes space for the student's name so that the attendance, deportment record, homework and class work evaluation may all be marked on the individual unit and the same moved about on the base sheet corresponding with the student's actual seat location in the classroom, thus making a convenient easy to manage and inexpensive classroom seating chart which is easily maintained to match current seating arrangement of the student's, thus providing a ready identification for the teacher or instructor.

DESCRIPTION OF THE DRAWING

FIG. 1 is a plan view of a portion of a classroom seating chart with removable elements with parts broken away and illustrating one of the movable elements partly separated therefrom.

FIG. 2 is a plan view of one of the elements of the composite classroom seating chart seen in FIG. 1.

DESCRIPTION OF THE PREFERRED EMBODIMENT

In its simplest form the classroom seating chart with removable elements comprises a sheet of paper 10 of letterhead size which may be fitted into a teacher's loose leaf record book if desired and which sheet of paper carries a plurality of individual square or rectangular units 11 having self-adhering adhesive material on the backs thereof. Each of the units 11 includes a blank space 12 for the student's name and a plurality of vertically arranged columns 13 which are numbered to correspond with the weeks of the grade or marking period as desired.

In FIGS. 1 and 2 of the drawings the vertical columns 13 carry the numbers 1 through 7 and three additional blank columns are provided in the event the same are needed in a longer than usual grade or marking period.

Each of the individual elements 11 also has five horizontal columns 14. The horizontal columns 14 correspond with the days of the week and are so numbered with the numerals 1 to five. The arrangement of the marking on each of the units 13 is such that there are actually ten vertical grade or marking period weekly columns 13, seven of which are numbered in the example illustrated, and five horizontal columns crossing the same and corresponding with the week days during which classes are meeting.

The corresponding spaces in the columns provide areas in which the attendance and/or the grades etc., may be marked for the individual student on the individual days in the individual weeks of the grade or marking period.

Still referring to FIG. 1 of the drawings, it will be seen that one of the units 11 has been partially removed from the base sheet 10 and that the back thereof is coated with a self-adhering adhesive 15. It will thus be seen that when a student changes his seat in the classroom the corresponding unit 11 may be easily removed from its original location and relocated in the particular location on the base sheet which matches the location of the student's seat in the classroom. It will also be seen, that if the student leaves the class permanently the individual unit carrying the student's attendance and or grade records may be removed from the base sheet.

Those skilled in the art will understand that the base sheet will carry additional blanks for the particular class, name or subject, the class period, the teacher's name, the room number and the date etc.

While only one embodiment of the present invention has been illustrated and described, it will be apparent to those skilled in the art that various changes and modifications may be made therein without departing from the spirit of the invention, and having thus described my invention, what I claim is:

1. A classroom seating chart for indicating the accumulative attendance record and seating arrangement of a student in a classroom, comprising: a base sheet, said sheet being divided into a plurality of substantially equally sized and shaped zones, the position of each zone on said sheet corresponding to the position of a student seat in said classroom; a plurality of substantially equally sized and shaped attendance charts, each having a size and shape substantially like that of said zones, each said chart having the name of a student inscribed on the face thereof and divided into a plurality of areas representing days and weeks and in which the attendance and grades of a student may be written; a self-adhering adhesive substance removably securing each of said individual charts on an area representing the seating position of the student named thereon in the classroom seating arrangement, so that said charts are interchangeable on said base sheet to accommodate student relocation in said classroom.

2. A classroom seating chart as in claim 1, wherein: the base sheet is substantially rectangular and is divided by a plurality of horizontal and vertical lines into a plurality of rows of substantially rectangular areas corresponding to the seating station of students in the classroom.

3. A classroom seating chart as in claim 2, wherein: each of said attendance charts is substantially rectangular and corresponds in size and shape to said rectangular areas on said base sheet.

4. A classroom seating chart as in claim 1, wherein: the base sheet and attendance charts are paper.

5. A classroom seating chart as in claim 4 wherein: the self-adhering adhesive is on the back of said attendance charts.

6. A classroom seating chart as in claim 4, wherein: the self-adhering adhesive is on the face of said base sheet.

7. A classroom seating chart as in claim 3, wherein: each of said attendance charts is divided by a plurality of horizontal and vertical lines into a plurality of substantially rectangular areas.

References Cited

UNITED STATES PATENTS

| | | | |
|---|---|---|---|
| 2,599,673 | 6/1952 | Trumbull et al. | 283—66 |
| 2,914,873 | 12/1959 | Brennan | 40—125 |
| 3,290,059 | 12/1966 | Newman | 283—18 |
| 3,421,239 | 1/1969 | Smith | 40—63 |
| 3,460,281 | 8/1969 | Levy | 35—7 |

EUGENE R. CAPOZIO, Primary Examiner

J. H. WOLFF, Assistant Examiner